United States Patent
Li et al.

(10) Patent No.: US 10,354,117 B2
(45) Date of Patent: Jul. 16, 2019

(54) FINGERPRINT IDENTIFICATION METHOD AND APPARATUS

(71) Applicant: BYD COMPANY LIMITED, Shenzhen (CN)

(72) Inventors: Zhengang Li, Shenzhen (CN); Kunping Xu, Shenzhen (CN); Yun Yang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 46 days.

(21) Appl. No.: 15/550,844

(22) PCT Filed: Jan. 5, 2016

(86) PCT No.: PCT/CN2016/070191
§ 371 (c)(1),
(2) Date: Aug. 14, 2017

(87) PCT Pub. No.: WO2016/127734
PCT Pub. Date: Aug. 18, 2016

(65) Prior Publication Data
US 2018/0032784 A1 Feb. 1, 2018

(30) Foreign Application Priority Data
Feb. 13, 2015 (CN) .......................... 2015 1 0080898

(51) Int. Cl.
*G06K 9/00* (2006.01)
*G06T 3/40* (2006.01)

(52) U.S. Cl.
CPC ............. *G06K 9/0008* (2013.01); *G06K 9/00* (2013.01); *G06K 9/001* (2013.01); *G06K 9/00013* (2013.01); *G06T 3/4038* (2013.01)

(58) Field of Classification Search
CPC .. G06K 9/0008; G06K 9/00013; G06K 9/001; G06K 9/0002; G06K 9/00067; G06K 9/00087; G06T 3/4038; G01B 7/28
See application file for complete search history.

(56) References Cited

U.S. PATENT DOCUMENTS 6,229,906 B1 * 5/2001 Pu ...................... G06K 9/00006
382/116
6,901,155 B2 * 5/2005 Xia .................... G06K 9/00067
382/115

(Continued)

FOREIGN PATENT DOCUMENTS

CN 1831847 A 9/2006
CN 101415607 A 4/2009

(Continued)

OTHER PUBLICATIONS

The World Intellectual Property Organization (WIPO) International Search Report for PCT/CN2016/070191, dated Mar. 23, 2016, 4 Pages.

*Primary Examiner* — Amir Alavi
(74) *Attorney, Agent, or Firm* — Anova Law Group, PLLC (57) ABSTRACT

The present disclosure provides a fingerprint identification method and apparatus. The fingerprint identification method includes obtaining a to-be-identified fingerprint image and extracting first characteristic points of the to-be-identified fingerprint image; determining whether a number of the first characteristic points of the to-be-identified fingerprint image is less than a predetermined threshold: when the number of the first characteristic points of the to-be-identified fingerprint image is less than the predetermined threshold, selecting, a fingerprint template image according to the number of the first characteristic points; extracting second characteristic points in the fingerprint template image matching with the first characteristic points of the to-be-identified fingerprint image; overlapping the fingerprint template image with (Continued)

the to-be-identified fingerprint image according to the first characteristic points of the to-be-identified fingerprint image and the second characteristic points of the fingerprint template image to form an overlapped image; determining a valid coincidence region between the to-be-identified fingerprint image and the fingerprint template image in the overlapped image; and determining whether the to-be-identified fingerprint image matches the fingerprint template image according to the valid coincidence region to generate a matching result and performing fingerprint identification based on the matching result. According to the disclosed method, fingerprint identification with less characteristic points can be realized, thus improving the success rate of the fingerprint identification, and reducing the identification error rate.

18 Claims, 6 Drawing Sheets

(56) References Cited

U.S. PATENT DOCUMENTS

| | | | |
|---|---|---|---|
| 7,110,581 B2 * | 9/2006 | Xia | G06K 9/00067 382/124 |
| 7,248,722 B2 * | 7/2007 | Wada | G06K 9/00087 340/5.53 |
| 8,045,767 B2 * | 10/2011 | Du | G06K 9/00026 382/100 |
| 9,245,165 B2 * | 1/2016 | Slaby | G06K 9/00013 |
| 9,886,619 B2 * | 2/2018 | Shi | G06K 9/00093 |
| 2010/0215224 A1 | 8/2010 | Saito | |
| 2014/0212008 A1 | 7/2014 | Hatcher, II et al. | |
| 2018/0032784 A1 * | 2/2018 | Li | G06K 9/00 |
| 2018/0268186 A1 * | 9/2018 | Zhou | G06K 9/00013 |
| 2018/0299248 A1 * | 10/2018 | Li | G01B 7/28 |

FOREIGN PATENT DOCUMENTS

| | | |
|---|---|---|
| CN | 102262730 A | 11/2011 |
| CN | 103714159 A | 4/2014 |
| CN | 104036269 A | 9/2014 |
| CN | 104156707 A | 11/2014 |
| TW | 200620140 A | 6/2006 |
| TW | 200843445 A | 11/2008 |
| TW | 201044280 A | 12/2010 |
| WO | 2014120636 A1 | 8/2014 |

* cited by examiner

FINGERPRINT IDENTIFICATION METHOD AND APPARATUS

CROSS-REFERENCES TO RELATED APPLICATIONS

This application is a national phase entry under 35 U.S.C. § 371 of International Application No. PCT/CN2016/070191, filed on Jan. 5, 2016, which claims priority to and benefits of Chinese Patent Application Serial No. 201510080898.2, filed with the State Intellectual Property Office of P. R. China on Feb. 13, 2015, the content of all of which is incorporated herein by reference.

FIELD

The present disclosure relates to a fingerprint identification technology field and, more particularly to a fingerprint identification method and a fingerprint identification apparatus.

BACKGROUND

With the development of the fingerprint detection and identification technology, the fingerprint identification technology has been applied more and more in the all kinds of fields. For example, the fingerprint identification technology is used in the fingerprint unlock function for mobile phones, computers and other mobile terminals. Among a large number of fingerprint detection and identification methods, the chip-based capacitive detection and identification method, because of its advantages such as small size, low power consumption, etc., becomes among first choices in the mobile phone and tablet market.

Nowadays, most of the fingerprint identification methods are based on characteristic-point algorithms, in which the characteristic points refer to the fork point and the end point in the ridge line of the fingerprint. When collecting finger prints, a larger size fingerprint detection chip can collect a larger fingerprint image area, and the characteristic points in the collected fingerprint image are relatively more; but a smaller size fingerprint detection chip can only collect the fingerprint image containing a relatively small number of characteristic points. When the fingerprint image contains fewer characteristic points, there is a certain difficulty to make the fingerprint identification. However, to many situations, it is necessary to process the fingerprint identification using the fingerprint image having fewer characteristic points. For example, due to the limit by the size and the thickness of the mobile terminal, the size of the fingerprint detection chip becomes smaller and smaller, and the thickness of the fingerprint detection chip becomes smaller and smaller, and thus the detected characteristic points of the fingerprint image are less. In addition, the fingerprint characteristic points of some people are very few and, even if the collection area is large enough, it is difficult to detect a lot of characteristic points.

In these conditions, because the characteristic point information is too little, it is easy to cause matching failure, and thus the collected fingerprint cannot be identified; or the matching is success but with the wrong identification result. Thus, the fingerprint identification success rate is low and the accuracy is poor.

SUMMARY

Embodiments of the present disclosure seek to solve at least one of the problems existing in the related art to at least some extent. As such, the present disclosure provides a fingerprint identification method to realize the fingerprint identification with less characteristic points, to improve the success rate of the fingerprint identification, to reduce the identification error rate, and to enhance the user experience.

The present disclosure also provides a fingerprint identification apparatus.

According to embodiments of a first aspect of the present disclosure, a fingerprint identification method is provided. The method includes: obtaining a to-be-identified fingerprint image and extracting first characteristic points of the to-be-identified fingerprint image; determining whether a number of the first characteristic points of the to-be-identified fingerprint image is less than a predetermined threshold; when the number of the first characteristic points of the to-be-identified fingerprint image is less than the predetermined threshold, selecting a fingerprint template image according to the number of the first characteristic points; extracting second characteristic points in the fingerprint template image matching with the first characteristic points of the to-be-identified fingerprint image; overlapping the fingerprint template image with the to-be-identified fingerprint image according to the first characteristic points of the to-be-identified fingerprint image and the second characteristic points of the fingerprint template image to form an overlapped image; determining a valid coincidence region between the to-be-identified fingerprint image and the fingerprint template image in the overlapped image; and determining whether the to-be-identified fingerprint image matches the fingerprint template image according to the valid coincidence region to generate a matching result and performing fingerprint identification based on the matching result.

According to the fingerprint identification method disclosed by embodiments of the present disclosure, by extracting the first characteristic points of the to-be-identified fingerprint image and, when the number of the first characteristic points is less than a predetermined threshold, and selecting the fingerprint template image based on the first characteristic points, the to-be-identified fingerprint image and the fingerprint template image can be overlapped and matched based on the first characteristic points and the second characteristic points in the fingerprint template image matching the first characteristic points, and the fingerprint identification is performed according to the matching result. Thus, when the characteristic points are relatively fewer, it is possible to perform second matching on the similarity between the to-be-identified fingerprint image and the fingerprint template image, the fingerprint identification with less characteristic points can be realized, thus improving the success rate of the fingerprint identification, reducing the identification error rate, and enhancing the user experience.

According to embodiments of a second aspect of the present disclosure, a fingerprint identification apparatus is provided. The fingerprint identification apparatus includes: an extracting module configured to obtain a to-be-identified fingerprint image and to extract first characteristic points of the to-be-identified fingerprint image; a selecting module configured to, when a number of the first characteristic points of the to-be-identified fingerprint image is less than a predetermined threshold, select a fingerprint template image according to the number of the first characteristic points and to extract second characteristic points of the fingerprint template image matching with the first characteristic points of the to-be-identified fingerprint image; a generating module configured to overlap the fingerprint template image with the to-be-identified fingerprint image according to the first characteristic points of the to-be-identified fingerprint image and the second characteristic points of the fingerprint template image to form an overlapped image; a collecting module configured to determine a valid coincidence region between the to-be-identified fingerprint image and the fingerprint template image in the overlapped image; and an identifying module configured to determine whether the to-be-identified fingerprint image matches the fingerprint template image according to the valid coincidence region to generate a matching result and to perform fingerprint identification based on the matching result.

According to the fingerprint identification apparatus disclosed by embodiments of the present disclosure, by extracting the first characteristic points of the to-be-identified fingerprint image and, when the number of the first characteristic points is less than a predetermined threshold, and selecting the fingerprint template image based on the first characteristic points, the to-be-identified fingerprint image and the fingerprint template image can be overlapped and matched based on the first characteristic points and the second characteristic points in the fingerprint template image matching the first characteristic points, and the fingerprint identification is performed according to the matching result. Thus, when the characteristic points are relatively fewer, it is possible to perform second matching on the similarity between the to-be-identified fingerprint image and the fingerprint template image, the fingerprint identification with less characteristic points can be realized, thus improving the success rate of the fingerprint identification, reducing the identification error rate, and enhancing the user experience.

Additional aspects and advantages of the present disclosure will be partly presented in the following descriptions, and partly become obviously in the following descriptions, or can be understood by practicing the present disclosure.

DETAILED DESCRIPTION

Exemplary embodiments will be described in detail herein, and examples thereof are illustrated in accompanying; drawings. Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the following, a fingerprint identification method and a fingerprint identification apparatus are described in detail with reference to drawings.

Figure 1:
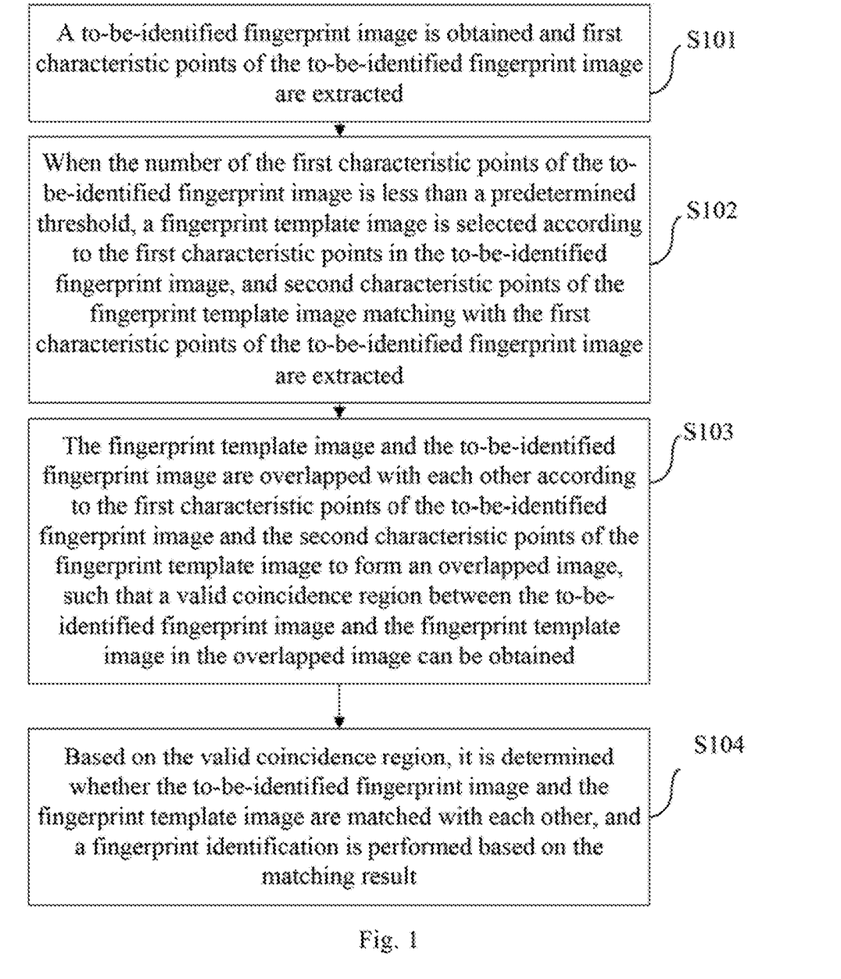
FIG. 1 is a flow chart of a fingerprint detection method according to an exemplary embodiment of the present disclosure.

FIG. 1 is a flow chart of a fingerprint detection method according to an exemplary embodiment of the present disclosure. As shown in FIG. 1, the fingerprint detection method includes following steps.

Step S101, a to-be-identified fingerprint image is obtained and first characteristic points of the to-be-identified fingerprint image are extracted.

Figure 2:
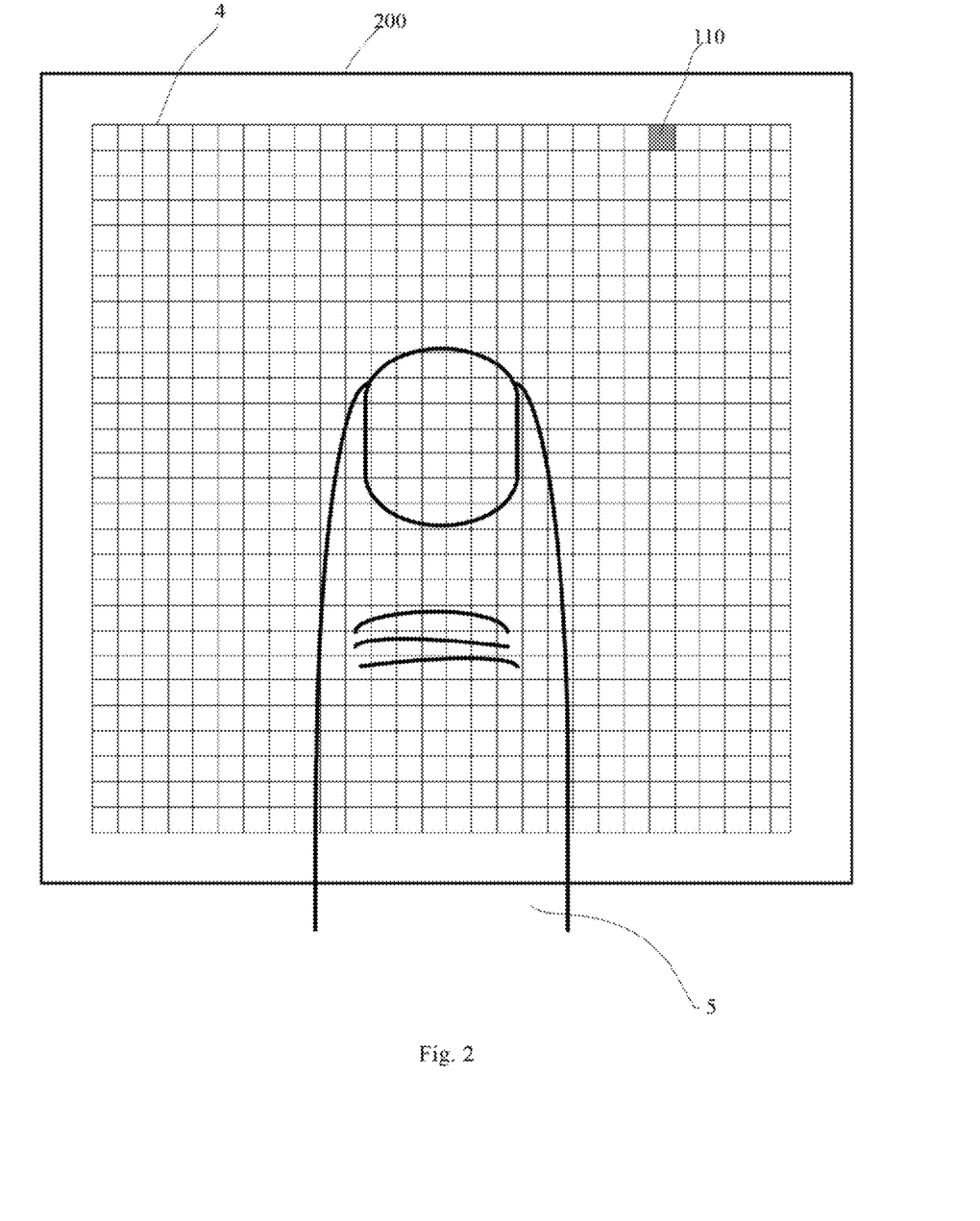
FIG. 2 is a schematic diagram of a fingerprint input process according to an exemplary embodiment of the present disclosure.
Figure 3:
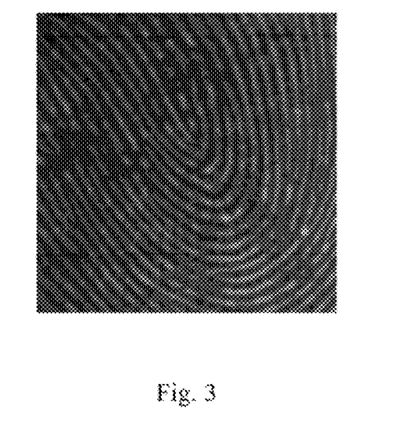
FIG. 3 is a schematic diagram of a to-be identified fingerprint image according to an exemplary embodiment of the present disclosure.

In an embodiment, the to-be-identified fingerprint image can be obtained by any fingerprint input system, such as mobile phone, tablet PCs, and notebook computers. FIG. 2 is a schematic diagram of a fingerprint input process of the fingerprint detection device according to an exemplary embodiment of the present disclosure. As shown in FIG. 2, numeral 5 refers to a finger, numeral 4 refers to an array of the fingerprint detection units, numeral 110 refers to a single fingerprint detection unit, and numeral 200 refers to a fingerprint detection module of the detection device. FIG. 3 is a schematic diagram of a to-be identified fingerprint image according to an exemplary embodiment of the present disclosure.

It should be noted that the characteristic points (the first characteristic points and the second characteristic points) or feature points in the embodiments of the present disclosure refer to any appropriate fingerprint characteristic point information, such as the fork points and the end points in the ridge lines of the fingerprint. The method for extracting the characteristic points from the fingerprint can be referred to certain photographic techniques, detailed description is omitted herein.

In an embodiment, after obtaining the to-be-identified fingerprint image, the to-be-identified fingerprint image can be filtered and smoothed, and the first characteristic points can be extracted from the to-be-identified fingerprint image after filtering and smoothing. The method of extracting the first characteristic points may refer to certain photographic techniques.

Step S102, when the number of the first characteristic points of the to-be-identified fingerprint image is less than a predetermined threshold, a fingerprint template image is selected according to the first characteristic points in the to-be-identified fingerprint image, and second characteristic points of the fingerprint template image matching with the first characteristic points of the to-be-identified fingerprint image are extracted.

Specifically, after extracting the first characteristic points, it is judged whether the number of the first characteristic points is less than the predetermined threshold. When the number of the first characteristic points is not less than the predetermined threshold, the fingerprint can be matched and identified via a characteristic-point algorithm. That is, the extracted first characteristic points are compared with characteristic points of fingerprint template images from a fingerprint template database and, based on the comparison results, a fingerprint template image matching the to-be-identified fingerprint image can be determined (i.e., a fingerprint template image having characteristic points matching with the extracted first characteristic points). The identification result can also be obtained.

However, when the number of the first characteristic points is relatively small, that is, the number of the first characteristic points is less than the predetermined threshold, even when the first characteristic points match with the characteristic points in the fingerprint template image, it is not necessarily indicated that that the to-be-identified fingerprint image is matched with the fingerprint template image. Therefore, the fingerprint template image can be selected and steps S103 to S104 are performed.

Further, the second characteristic points refer to characteristic points in the fingerprint template image matching with the first characteristic points.

In an embodiment of the present disclosure, the fingerprint template image is a tripleized image, and the width of a ridge line and/or a valley line in the fingerprint template image is a first width value. Further, a pixel value of a ridge line of the fingerprint template image is a first pixel value, a pixel value of a valley line of the fingerprint template image is a second pixel value, and a pixel value of background of the fingerprint template image is a third pixel value. For example, the pixel value of the ridge line of the fingerprint template image may be 127, the pixel value of the valley line may be 1, and the pixel value of the background may be zero. The first width value may be 5 pixels.

Step S103, the fingerprint template image and the to-be-identified fingerprint image are overlapped with each other according to the first characteristic points of the to-be-identified fingerprint image and the second characteristic points of the fingerprint template image to form an overlapped image, such that a valid coincidence region between the to-be-identified fingerprint image and the fingerprint template image in the overlapped image can be obtained. In other words, the matching portions of the fingerprint template image and the to-be-identified fingerprint image are coincident with each other as the valid coincidence region.

Figure 4:
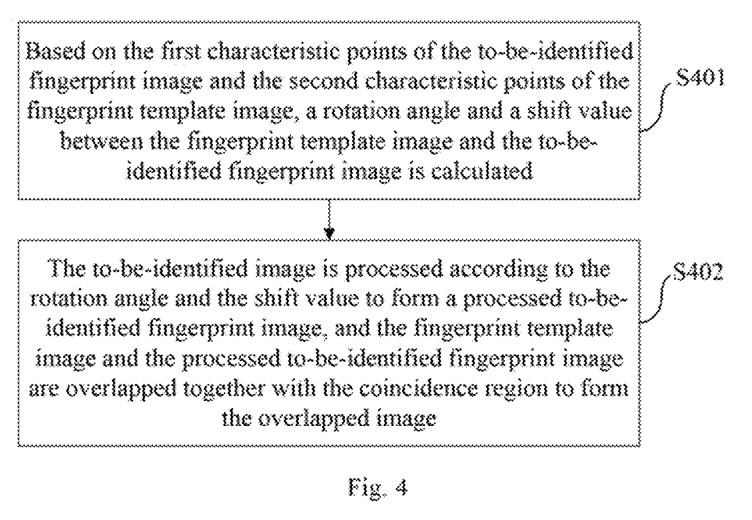
FIG. 4 is a flow chart of a process for matching the fingerprint template image and the to-be-identified fingerprint image to generate a coincidence region based on the first characteristic points and the second characteristic points according to an exemplary embodiment of the present disclosure.

FIG. 4 is a flow chart of a fingerprint detection method according to an exemplary embodiment of the present disclosure. As shown in FIG. 4, the fingerprint template image and the to-be-identified fingerprint image are overlapped with each other according to the first characteristic points of the to-be-identified fingerprint image and the second characteristic points of the fingerprint template image to form an overlapped image, including the following steps.

Step S401, based on the first characteristic points of the to-be-identified fingerprint image and the second characteristic points of the fingerprint template image, a rotation angle and a shift value between the fingerprint template image and the to-be-identified fingerprint image is calculated.

Step S402, the to-be-identified fingerprint image is processed according to the rotation angle and the shift value to form a processed to-be-identified fingerprint image, and the fingerprint template image and the processed to-be-identified fingerprint image are overlapped together to form the overlapped image.

Figure 5:
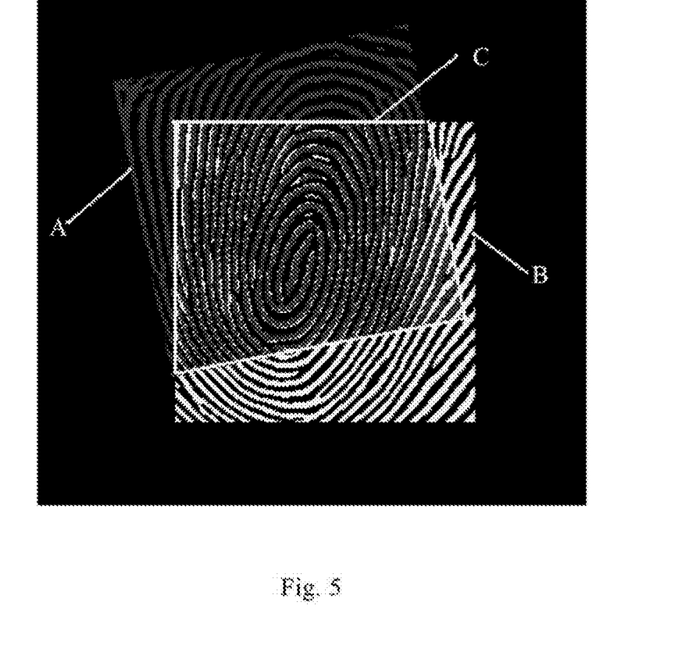
FIG. 5 is a schematic diagram of a coincidence region between the fingerprint template image and the to-be-identified fingerprint image according to an exemplary embodiment of the present disclosure.

In an embodiment, the to-be-identified fingerprint image is rotated according to the rotation angle and the to-be-identified fingerprint image after rotating is shifted according to the shift value, and thus parts of the fingerprint template image and the processed to-be-identified fingerprint image are overlapped with each other to form the overlapped image with the valid coincidence region. FIG. 5 is a schematic diagram of an overlapped image generated by the fingerprint template image and the to-be-identified fingerprint image according to an exemplary embodiment of the present disclosure. As shown in FIG. 5, the to-be-identified fingerprint image A has been overlapped with the fingerprint template image B to form the valid coincidence region C.

In an embodiment, before he fingerprint template image and the to-be-identified fingerprint image are overlapped with each other according to the first characteristic points of the to-be-identified fingerprint image and the second characteristic points of the fingerprint template image to form an overlapped image, the method further includes: a tripleization (three-valued) process is performed on the to-be-identified fingerprint image to set the pixel value of the ridge line of the fingerprint template image as the first pixel value, to set the pixel value of the valley line of the fingerprint template image as the second pixel value, and to set the pixel value of background of the fingerprint template image as the third pixel value. The width of the ridge line and/or the valley line in the fingerprint template image is set as the first width value.

For example, the pixel value of the ridge line of the fingerprint template image may be set to 127 (the first pixel value), the pixel value of the ridge line of the fingerprint template image may be set to 1 (the second pixel value), the pixel value of background of the fingerprint template image may be set to 0 (the third pixel value).

Because a binary image also needs to use the characteristic-point matching to identify the fingerprint, when the number of pixels in the to-be-identified the fingerprint image is small, the matching and identification results may be erroneous. Comparing to the binary image setting pixel values only for the ridge line and valley line, the tripleization image uses different pixel values to set the pixel values of the ridge line, the valley line, and the background, and the three pixel values (0, 1, and 127) in the tripleization image, with respect to the pixel values (0 and 1) in the binary image, can make more significant value difference. Further, by using the different three pixel values to perform statistical analysis on the pixel values of the pixels of the overlapped image, the number of the pixels with the three pixel values in the valid coincidence region can be calculated to represent the area of the valid coincidence region. Because the number of the pixels is not affected by the number of the characteristic points, with the tripleization process of the to-be-identified fingerprint image, the overlapping/coincidence, the matching, and the identification can be yield more accurate results, and the identification method is more simple, more efficient, and with more accurate identification result.

In addition, depending on certain conditions, such as different pressing force or different air temperature or the humidity, the line width of two fingerprints from the same finger may be slightly different, causing interference to the coinciding and the matching of the fingerprints. Thus, by setting the width of the ridge line and/or the valley line in the to-be-identified fingerprint image to the first width value, i.e., the width of the fingerprint lines of the to-be-identified fingerprint image is uniformly processed or uniformized, it is possible to effectively avoid the interference to the coinciding and the matching of the fingerprints from the above conditions, such as different pressing force or different air temperature or the humidity, so that fingerprint images are more easily to be identified and matched, and the fingerprint matching identification resolution and accuracy can be further improved.

Accordingly, after performing the tripleization process on the to-be-identified fingerprint image, the width of the ridge line and/or the valley line in the processed to-be-identified fingerprint image is set to the first width value. Taking the ridge line as an example, each ridge line of the to-be-identified fingerprint image can be set to 5 pixel widths.

The fingerprint template image in the fingerprint template storage may also be a tripleized image by the above-described processing (including the tripleization process and the ridge line and/or the valley width uniformization process).

After the overlapped image is generated, the area of the valid coincidence region between the to-be-identified fingerprint image and the fingerprint template image in the overlapped image can be obtained. The valid coincidence region is a region where the ridge lines of the two images coincide with each other, where the valley lines of the two images coincide with each other, and where the ridge lines coincide with the valley lines in the two images. As shown in FIG. 5, the valid coincidence region is region C.

In an embodiment, obtaining the valid coincidence region between the to-be-identified fingerprint image and the fingerprint template image in the overlapped image can include the followings: from the overlapped image, determining pixels having a fourth pixel value, pixels having a fifth pixel value, and pixels having a sixth pixel value as pixels in the valid coincidence region. The fourth pixel value is twice as the first pixel value, the fifth pixel value is a sum of the first pixel value and the second pixel value, and the sixth pixel value is twice as the second pixel value.

For example, when the first pixel value is 127, the second pixel value is 1, and the third pixel value is 0, the fourth pixel value is 254, the fifth pixel value is 128, and the sixth pixel value is 2. For the overlapped image obtained by overlapping the tripleized to-be-identified fingerprint image and fingerprint template image, pixels in the overlapped image possibly have the pixel values of 0, 1, 2, 127, 128, and 254, which may respectively present the following meaning.

0: the pixel is an overlapped pixel of two background pixels in the two images, or only a background pixel in one of the two images (no overlap), which is a pixel without fingerprint information.

1: the pixel is an overlapped pixel of a pixel of a fingerprint valley line (the pixel with a pixel value of 1) in one of the two images with a background pixel (the pixel with a pixel value of 0) in the other of the two images, or only a pixel of a fingerprint valley line in one of the two images (no overlap).

2: the pixel is an overlapped pixel of a pixel of a fingerprint valley line (the pixel with a pixel value of 1) in one of the two images with a pixel of a fingerprint valley line in the other of the two images.

127: the pixel is an overlapped pixel of a pixel of a fingerprint ridge line (the pixel with a pixel value of 127) in one of the two images with a background pixel (the pixel with a pixel value of 0) in the other of the two images, or only a pixel of a fingerprint ridge line in one of the two images (no overlap).

128: the pixel is an overlapped pixel of a pixel of a fingerprint ridge line (the pixel with a pixel value of 127) in one of the two images with a pixel of a fingerprint valley line (the pixel with a pixel value of 1) in the other of the two images. That is, the pixels of the fingerprint in the valid coincidence region of the two images do not coincide with each other.

254: the pixel is an overlapped pixel of a pixel of a fingerprint ridge line (the pixel with a pixel value of 127) in one of the two images with a pixel of a fingerprint ridge line in the other of the two images.

Because the invalid region of the tripleized image is 0, all the pixel values adding with the pixel value of 0 are from pixels of non-coincident region or an invalid region in the coincidence region. The pixel values of the pixels in the valid region of the tripleized image are only 1 and 127. It can be seen that, in the overlapped image, the pixel values of the pixels which are composed by the pixels of the fingerprint ridge lines in two images coinciding with each other are 254, the pixel values of the pixels which are composed by the pixels of the non-coincidence fingerprint ridge lines are 128, and the pixel values of the pixels which are composed by the pixels of the fingerprint valley lines in two images coinciding with each other are 2. The region which is composed by pixels with the above three pixel-values is the valid coincidence region. A region which is composed by pixels with other three pixel-values of 0, and 127 is the non-coincidence region in or coincident ground region, which is considered as an invalid region. Step S104, based on the valid coincidence region, it is determined whether the to-be-identified fingerprint image and the fingerprint template image are matched with each other, and a fingerprint identification is performed based on the matching result.

When the valid coincidence region is too small, the coincidence region lacks representativeness, and it is difficult to determine whether the to-be-identified fingerprint image matches with the fingerprint template image. When the valid coincidence region is large enough, it can determine whether the to-be-identified fingerprint image matches with the fingerprint template image, and to perform fingerprint identification.

In an embodiment, determining whether the to-be-identified fingerprint image matches with the fingerprint template image based on the valid coincidence region can include the followings: calculating the area of the valid coincidence region; judging whether the area of the valid coincidence region is larger than or equal to a predetermined region threshold; when the area of the valid coincidence region is larger than or equal to a predetermined region threshold, determining that the to-be-identified fingerprint image matches with the fingerprint template image and performing the fingerprint identification using the matching fingerprint template image; when the area of the valid coincidence region is less than the predetermined region threshold, determining that the to-be-identified fingerprint image does match with the fingerprint template image, and determining that the fingerprint identification fails.

In an embodiment, the area of the valid coincidence region can be represented by the total number of pixels in the valid coincidence region. If the total number is less than a predetermined region threshold (the predetermined region threshold can be set in the form of the number of the pixels, for example, 50,000 pixels), it is determined that the to-be-identified fingerprint image and the fingerprint template image are not matched and the fingerprint identification fails. If the total number is larger than or equal to the predetermined region threshold, it is determined that the to-be-identified fingerprint image matches with the fingerprint template image and the fingerprint identification is performed using the matching fingerprint template image.

In an embodiment, the total number of pixels with the pixel values of 254, 128, and 2 in the overlapped image can represent the area of the valid coincidence region. If the total number of the pixels having the three pixel-values is greater than or equal to a predetermined region threshold, it is determined that the to-be-identified fingerprint image matches with the fingerprint template image and the fingerprint identification is performed using the matching fingerprint template image.

In an embodiment, performing the fingerprint identification using the matching fingerprint template image includes: calculating a fingerprint-line matching degree between the to-be-identified fingerprint image and the fingerprint template image in the valid coincidence region, and determining whether the fingerprint-line matching degree is larger than a predetermined matching threshold, where the fingerprint-line matching degree is a ratio of the number of matching fingerprint-line pixels and the number of non-matching fingerprint-line pixels between the to-be-identified fingerprint image and the fingerprint template image; and, when the fingerprint-line matching degree is larger than the predetermined matching threshold, determining that the to-be-identified fingerprint image and the fingerprint template image are from a same finger. The fingerprint lines include the valley lines and the ridge lines of the fingerprint.

In an embodiment, the fingerprint-line matching degree is the ratio between the total number of the pixels with pixel values of 2 and 254 and the total number of the pixels with pixel value of 128. The larger the ratio, the less the difference between the to-be-identified fingerprint image and the fingerprint template image; and the less the ratio, the larger the difference between the to-be-identified fingerprint image and the fingerprint template image. Of course, the fingerprint-line matching degree can be also obtained based on other types of ratio between the number of coincident pixels and the number of non-coincident pixels in the valid coincidence region, for example, the ratio between the number of pixels with pixel value of 2 and the number of pixels with pixel value of 128, or the ratio between the number of pixels with pixel value of 254 and the number of pixels with pixel value of 128, etc. Thus, when the ratio is larger than the predetermined matching threshold, it can be determined that the to-be-identified fingerprint image and the fingerprint template image come from a same finger.

Accordingly, it can be seen that, after performing the tripleization process on to-be-identified fingerprint image and the fingerprint template image, by only calculating the number of pixels with the fourth pixel value, the fifth pixel value, and the sixth pixel value, and the related ratios, the fingerprint-line matching degree between the to-be-identified fingerprint image and the fingerprint template image can be determined and, thus, the identification result can be obtained more simple and quickly. In addition, contrary to the conventional techniques where it is difficult to effectively to identify a fingerprint image with small area due to the binary processing method, the disclosed method is not limited by the size of the to-be identified fingerprint image, and the identification efficiency is increased.

According to the fingerprint identification method disclosed by embodiments of the present disclosure, by extracting the first characteristic points of the to-be-identified fingerprint image and, when the number of the first characteristic points is less than a predetermined threshold, and selecting the fingerprint template image based on the first characteristic points, the to-be-identified fingerprint image and the fingerprint template image can be overlapped and matched based on the first characteristic points and the second characteristic points in the fingerprint template image matching the first characteristic points, and the fingerprint identification is performed according to the matching result. Thus, when the characteristic points are relatively fewer, it is possible to perform second matching on the similarity between the to-be-identified fingerprint image and the fingerprint template image, the fingerprint identification with less characteristic points can be realized, thus improving the success rate of the fingerprint identification, reducing the identification error rate, and enhancing the user experience.

Figure 6:
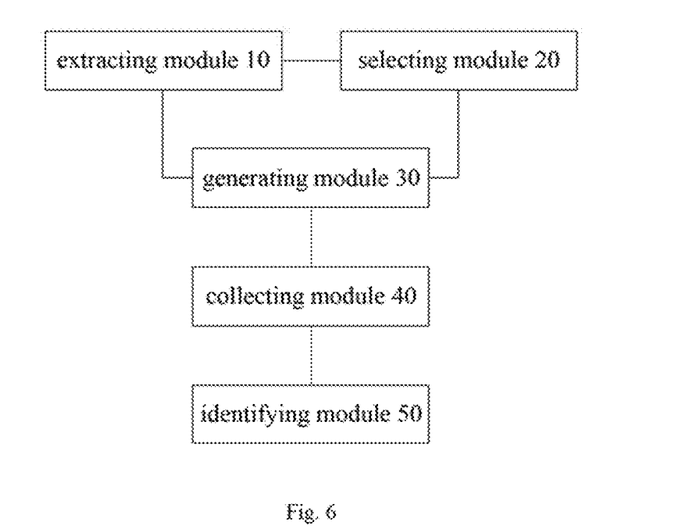
FIG. 6 is a schematic diagram of a fingerprint identification apparatus according to an exemplary embodiment of the present disclosure.

FIG. 6 is a schematic diagram of a fingerprint identification apparatus according to an exemplary embodiment of the present disclosure. As shown in FIG. 6, the fingerprint identification apparatus includes an extracting module 10, a selecting module 20, a generating module 30, a collecting module 40, and an identifying module 50.

In an embodiment, the extracting module 10 is configured to collect the to-be-identified fingerprint image and to extract first characteristic points or feature points of the to-be-identified fingerprint image. The to-be-identified fingerprint image can be obtained by an fingerprint input system, such as a mobile phone, a tablet PC, or a notebook computer. FIG. 2 is the schematic diagram of a fingerprint input process of the fingerprint detection device according to an exemplary embodiment of the present disclosure. In which, number 5 refers to a finger, number 4 refers to an array of fingerprint detection units, number 110 refers to single fingerprint detection unit, and number 200 refers to the fingerprint detection module of the detection device. FIG. 3 is a schematic diagram of a to-be identified fingerprint image according to an exemplary embodiment of the present disclosure.

In an embodiment, the extracting module 10 is configured to filter and smooth the to-be-identified fingerprint image and after collecting the to-be-identified fingerprint image, and to extract the first characteristic points from the to-be-identified fingerprint image after filtering and smoothing. The method of extracting the first characteristic points may refer to the related art.

The selecting module 20 is configured to, when the number of the first characteristic points of the to-be-identified fingerprint image is less than a predetermined threshold, select a fingerprint template image according to the first characteristic points in the to-be-identified fingerprint image, and to extract second characteristic points of the fingerprint template image matching with the first characteristic points of the to-be-identified fingerprint image.

In an embodiment, after extracting the first characteristic points, it is judged whether the number of the first characteristic points is less than the predetermined threshold. When the number of the first characteristic points is not less than the predetermined threshold, the fingerprint can be matched and identified a characteristic-point algorithm. That is, the extracted first characteristic points are compared with characteristic points of fingerprint template images from a fingerprint template database and, based on the comparison results, a fingerprint template image matching the to-be-identified fingerprint image can be determined (i.e., a fingerprint template image having characteristic points matching with the extracted first characteristic points). The identification result can also be obtained.

However, when the number of the first characteristic points is relatively small, that is, the number of the first characteristic points is less than the predetermined threshold, even when the first characteristic points match with the characteristic points in the fingerprint, template image, it is not necessarily indicated that that the to-be-identified fingerprint image is matched with the fingerprint template image. Therefore, the selecting module 20 can select the fingerprint template image and the fingerprint identification is performed by the generating module 30, the collecting module 40, and the identifying module 50.

Further, the second characteristic points refer to characteristic points in the fingerprint template image matching with the first characteristic points.

In an embodiment of the present disclosure, the fingerprint template image is a tripleized image, and the width of a ridge line and/or a valley line in the fingerprint template image is a first width value. Further, a pixel value of a ridge line of the fingerprint template image is a first pixel value, a pixel value of a valley line of the fingerprint template image is a second pixel value, and a pixel value of background of the fingerprint template image is a third pixel value. For example, the pixel value of the ridge line of the fingerprint template image may be 127, the pixel value of the valley line may be 1, and the pixel value of the background may be zero. The first width value may be 5 pixels.

The generating module 30 is configured to overlap the fingerprint template image and the to-be-identified fingerprint image according to the first characteristic points of the to-be-identified fingerprint image and the second characteristic points of the fingerprint template image to form an overlapped image, and to obtain a valid coincidence region between the to-be-identified fingerprint image and the fingerprint template image in the overlapped image.

Figure 7:
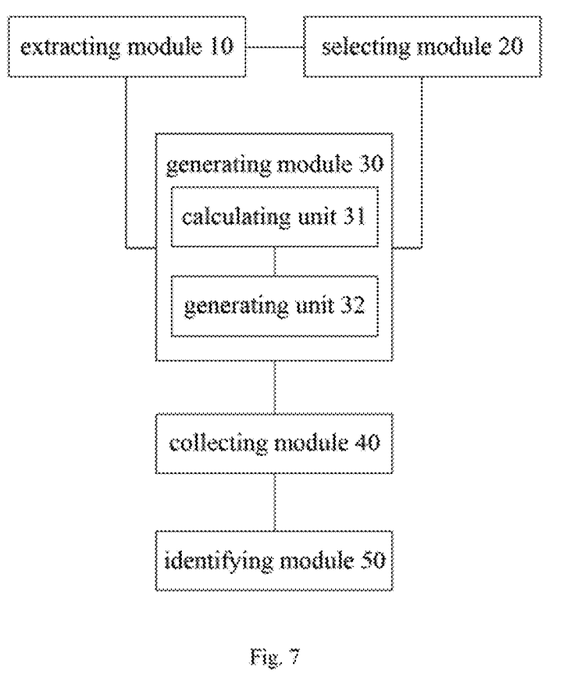
FIG. 7 is a schematic diagram of a fingerprint identification apparatus according to another exemplary embodiment of the present disclosure.

FIG. 7 is a schematic diagram of a fingerprint identification apparatus according to an exemplary embodiment of the present disclosure. As shown in FIG. 7, the generating module 30 includes a calculating unit 31 and a generating unit 32.

The calculating unit 31 is configured to calculate a rotation angle and a shift value between the fingerprint template image and the to-be-identified fingerprint image according to the first characteristic points of the to-be-identified fingerprint image and the second characteristic points of the fingerprint template image.

The generating unit 32 is configured to process the to-be-identified fingerprint image according to the rotation angle and the shift value to form a processed to-be-identified fingerprint image, and to overlap the fingerprint template image with and the processed to-be-identified fingerprint image to form the overlapped image with a coincident portion. In an embodiment, the generating unit 32 is configured to rotate the to-be-identified fingerprint image according to the rotation angle and to shift the to-be-identified fingerprint image after rotating according to the shift value, and thus the fingerprint template image and the processed to-be-identified fingerprint image are overlapped with each other to form the overlapped image. FIG. 5 is a schematic diagram of an overlapped image generated by the fingerprint template image and the to-be-identified fingerprint image according to an exemplary embodiment of the present disclosure. As shown in FIG. 5, the to-be-identified fingerprint image A has been coincided with the fingerprint template image B with a coincidence region C.

Figure 8:
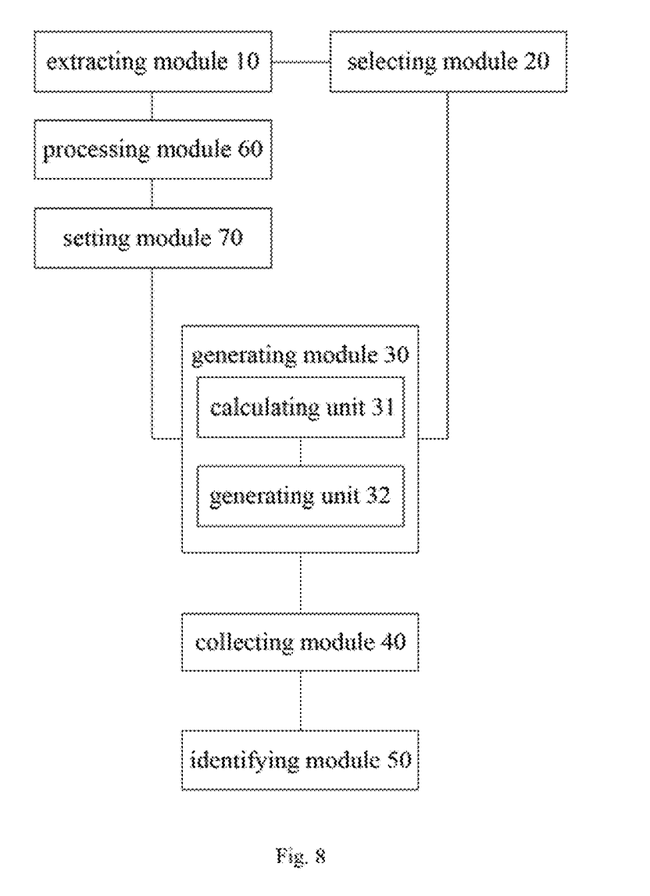
FIG. 8 is a schematic diagram of a fingerprint identification apparatus according to another exemplary embodiment of the present disclosure.

FIG. 8 is a schematic diagram of a fingerprint identification apparatus according to an exemplary embodiment of the present disclosure. As shown in FIG. 8, the fingerprint identification apparatus further includes: a processing module 60 and a setting module 70, to perform a tripleization process on the to-be-identified fingerprint and to perform a uniformization process on the width of the fingerprint lines.

In an embodiment, the processing module 60 is configured to perform the tripleization process to set the pixel value of the ridge line of the fingerprint template image as the first pixel value, to set the pixel value of the valley line of the fingerprint template image as the second pixel value, and to set the pixel value of background of the fingerprint template image as the third pixel value.

For example, the pixel value of the ridge line of the fingerprint template image may be set to 127 (the first pixel value), the pixel value of the ridge line of the fingerprint template image may be set to 1 (the second pixel, value), the pixel value of background of the fingerprint template image may be set to 0 (the third pixel value).

Because a binary image also needs to use the characteristic-point matching to identify the fingerprint, when the number of pixels in the to-be-identified the fingerprint image is small, the matching and identification results may be erroneous. Comparing to the binary image setting pixel values only for the ridge line and valley line, the tripleization image uses different pixel values to set the pixel values of the ridge line, the valley line, and the background, and the three pixel values (0, 1, and 127) in the tripleization image, with respect to the pixel values (0 and 1) the binary image, can make more significant value difference. Further, by using the different three pixel values to perform statistical analysis on the pixel values of the pixels of the overlapped image, the number of the pixels with the three pixel values in the valid coincidence region can be calculated to represent the area of the valid coincidence region. Because the number of the pixels is not affected by the number of the characteristic points, with the tripleization process of the to-be-identified fingerprint image, the overlapping/coincidence, the matching, and the identification can be yield more accurate results, and the identification method is more simple, more efficient, and with more accurate identification result.

The setting module 70 is configured to set the width of the ridge line and/or the valley line in the to-be-identified fingerprint image to the first width value. The first width value can be predetermined, for example, the first width value may be 5 pixels. After the tripleization process on the to-be-identified fingerprint image is performed, the width of the ridge line and/or the valley line in the processed to-be-identified fingerprint image is set to the first width value. Taking the ridge line as an example, each ridge line of the to-be-identified fingerprint image can be set to 5 pixel widths.

In addition, depending on certain conditions, such as different pressing force or different air temperature or the humidity, the line width of two fingerprints from the same finger may be slightly different, causing interference to the coinciding and the matching of the fingerprints. Thus, by setting the width of the ridge line and/or the valley line in the to-be-identified fingerprint image to the first width value, i.e., the width of the fingerprint lines of the to-be-identified fingerprint image is uniformly processed or uniformized, it is possible to effectively avoid the interference to the coinciding and the matching of the fingerprints from the above conditions, such as different pressing force or different air temperature or the humidity, so that fingerprint images are more easily to be identified and matched, and the fingerprint matching identification resolution and accuracy can be further improved.

The fingerprint template image in the fingerprint template storage may also be a tripleized image by the above-described processing (including the tripleization process and the ridge line and or the valley width uniformization process).

The collecting module 40 is configured to collect the valid coincidence region between the to-be-identified fingerprint image and the fingerprint template image in the overlapped image. The valid coincidence region is a region where the ridge lines of the two images coincide with each other, where the valley lines of the two images coincide with each other, and where the ridge lines coincide with the valley lines in the two images. As shown in FIG. 5, the valid coincidence region is region C.

In an embodiment, the collecting module 40 may determine, from the overlapped image, pixels having a fourth pixel value, pixels having a fifth pixel value, and pixels having a sixth pixel value as pixels in the valid coincidence region. The fourth pixel value is twice as the first pixel value, the fifth pixel value is a sum of the first pixel value and the second pixel value, and the sixth pixel value is twice as the second pixel value.

For example, when the first pixel value is 127, the second pixel value is 1, and the third pixel value is 0, the fourth pixel value is 254, the fifth pixel value is 128, and the sixth pixel value is 2. For the overlapped image obtained by overlapping the tripleized to-be-identified fingerprint image and fingerprint template image, pixels in the overlapped image possibly have the pixel values of 0, 1, 2, 127, 128, and 254, which may respectively present the following meaning.

0: the pixel is an overlapped pixel of two background pixels in the two images, or only a background pixel in one of the two images (no overlap), which is a pixel without fingerprint information.

1: the pixel is an overlapped pixel of a pixel of a fingerprint valley line (the pixel with a pixel value of 1) in one of the two images with a background pixel. (the pixel with a pixel value of 0) in the other of the two images, or only a pixel of a fingerprint valley line in one of the two images (no overlap).

2: the pixel is an overlapped pixel of a pixel of a fingerprint valley line (the pixel with a pixel value of 1) in one of the two images with a pixel of a fingerprint valley line in the other of the two images.

127: the pixel is an overlapped pixel of a pixel of a fingerprint ridge line (the pixel with a pixel value of 127) in one of the two images with a background pixel (the pixel with a pixel value of 0) in the other of the two images, or only a pixel of a fingerprint ridge line in one of the two images (no overlap).

128: the pixel is an overlapped pixel of a pixel of a fingerprint ridge line (the pixel with a pixel value of 127) in one of the two images with a pixel of a fingerprint valley line (the pixel with a pixel value of 1) in the other of the two images. That is, the pixels of the fingerprint in the valid coincidence region of the two images do not coincide with each other.

254: the pixel is an overlapped pixel of a pixel of a fingerprint ridge line (the pixel with a pixel value of 127) in one of the two images with a pixel of a fingerprint ridge line in the other of the two images.

Because the invalid region of the tripleized image is 0, all the pixel values adding with the pixel value of 0 are from pixels of non-coincident region or an invalid region in the coincidence region. The pixel values of the pixels in the valid region of the tripleized image are only 1 and 127. It can be seen that, in the overlapped image, the pixel values of the pixels which are composed by the pixels of the fingerprint ridge lines in two images coinciding with each other are 254, the pixel values of the pixels which are composed by the pixels of the non-coincidence fingerprint ridge lines are 128, and the pixel values of the pixels which are composed by the pixels of the fingerprint valley lines in two images coinciding with each other are 2. The region which is composed by pixels with the above three pixel-values is the valid coincidence region. A region which is composed by pixels with other three pixel-values of 0, 1, and 127 is the non-coincidence region or coincident ground region, which is considered as an invalid region. As shown in FIG. 5, the valid coincidence region is region C.

The identifying module 50 is configured to, based on the valid coincidence region, determine whether the to-be-identified fingerprint image and the fingerprint template image are matched with each other, and to perform a fingerprint identification based on the matching result.

When the valid coincidence region is too small, the coincidence region lacks representativeness, and it is difficult to determine whether the to-be-identified fingerprint image matches with the fingerprint template image. When the valid coincidence region is large enough, it can determine whether the to-be-identified fingerprint image matches with the fingerprint template image, and to perform fingerprint identification.

In an embodiment, the identifying module 50 is further configured to: calculate the area of the valid coincidence region; judge whether the area of the valid coincidence region is larger than or equal to a predetermined region threshold; when the area of the valid coincidence region is larger than or equal to a predetermined region threshold, determine that the to-be-identified fingerprint image matches with the fingerprint template image and performing the fingerprint identification using the matching fingerprint template image; and when the area of the valid coincidence region is less than the predetermined region threshold, determine that the to-be-identified fingerprint image does match with the fingerprint template image, and determine that the fingerprint identification fails.

In an embodiment, the area of the valid coincidence region can be represented by the total number of pixels in the valid coincidence region, if the total number is less than a predetermined region threshold (the predetermined region threshold can be set in the form of the number of the pixels, for example, 50,000 pixels), it is determined that the to-be-identified fingerprint image and the fingerprint template image are not matched and the fingerprint identification fails. If the total number is larger than or equal to the predetermined region threshold, it is determined that the to-be-identified fingerprint image matches with the fingerprint template image and the fingerprint identification is performed using the matching fingerprint template image.

In an embodiment, the total number of pixels with the pixel values of 254, 128, and 2 in the overlapped image can represent the area of the valid coincidence region. If the total number of the pixels having the three pixel-values is greater than or equal to a predetermined region threshold, it is determined that the to-be-identified fingerprint image matches with the fingerprint template image and the fingerprint identification is performed using the matching fingerprint template image.

In an embodiment, the identifying module 50 is further configured to: calculate a fingerprint-line matching degree between the to-be-identified fingerprint image and the fingerprint template image in the valid coincidence region, determine whether the fingerprint-line matching degree is larger than a predetermined matching: threshold, where the fingerprint-line matching degree is a ratio of the number of matching fingerprint-line pixels and the number of non-matching fingerprint-line pixels between the to-be-identified fingerprint image and the fingerprint template image; and, when the fingerprint-line matching degree is larger than the predetermined matching threshold, determine that the to-be-identified fingerprint image and the fingerprint template image are from a same finger. That is, the identifying, module 50 can perform fingerprint identification by calculating, the matching, degree between the to-be-identified fingerprint image and the fingerprint template image. The fingerprint lines include the valley lines and the ridge lines of the fingerprint.

For example, the fingerprint-line matching degree is the ratio between the total number of the pixels with pixel values of 2 and 254 and the total number of the pixels with pixel value of 128. The larger the ratio, the less the difference between the to-be-identified fingerprint image and the fingerprint template image; and the less the ratio, the larger the difference between the to-be-identified fingerprint image and the fingerprint template image. Of course, the fingerprint-line matching degree can be also obtained based on other types of ratio between the number of coincident pixels and the number of non-coincident pixels in the valid coincidence region, for example, the ratio between the number of pixels with pixel value of 2 and the number of pixels with pixel value of 128, or the ratio between the number of pixels with pixel value of 254 and the number of pixels with pixel value of 128, etc. Thus, when the ratio is larger than the predetermined matching threshold, it can be determined that the to-be-identified fingerprint image and the fingerprint template image come from a same finger.

Accordingly, it can be seen that, after performing the tripleization process on to-be-identified fingerprint image and the fingerprint template image, by only calculating the number of pixels with the fourth pixel value, the fifth pixel value, and the sixth pixel value, and the related ratios, the fingerprint-line matching degree between the to-be-identified fingerprint image and the fingerprint template image can be determined and, thus, the identification result can be obtained more simple and quickly. In addition, contrary to the conventional techniques where it is difficult to effectively to identify a fingerprint image with small area due to the binary processing method, the disclosed method is not limited by the size of the to-be identified fingerprint image, and the identification efficiency is increased.

With the fingerprint identification apparatus according to embodiments of the present disclosure, by extracting the first characteristic points of the to-be-identified fingerprint image and, when the number of the first characteristic points is less than a predetermined threshold, and selecting the fingerprint template image based on the first characteristic points, the to-be-identified fingerprint image and the fingerprint template image can be overlapped and matched based on the first characteristic points and the second characteristic points in the fingerprint template image matching the first characteristic points, and the fingerprint identification is performed according to the matching result. Thus, when the characteristic points are relatively fewer, it is possible to perform second matching on the similarity between the to-be-identified fingerprint image and the fingerprint template image, the fingerprint identification with less characteristic points can be realized, thus improving the success rate of the fingerprint identification, reducing the identification error rate, and enhancing the user experience.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom ", "inner", "outer", "clockwise", "anticlockwise" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or interaction between two elements. Those skilled in the art can understand the specific meanings in the present disclosure according to specific situations.

In the specification, unless specified or limited otherwise, that a first feature is "above" or "under" a second feature can mean that the first and second features contact each other directly or via an intermediate medium. Further, that the first feature is "above", "up", "upwardly" of the second features can mean that the first feature is at a position directly above or obliquely above the second feature, or can just mean that the first feature is at a height larger than the second feature. That the first feature is "below", "down", "downwardly" of the second features can mean that the first feature is at a position directly below or obliquely below the second feature, or can just mean that the first feature is at a height smaller than the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. Without any conflict, those skilled in the art can combine features from different embodiments or examples in this disclosure.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise to another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc. In certain embodiments, the apparatus may include a hardware processor, such as a micro-controller, a central processing unit (CPU), a graphic processing unit (GPU), or any other hardware processor coupled to or coincident with the fingerprint detection chip for performing the disclosed functionalities and methods.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium. The storage medium mentioned above may be read-only memories, magnetic disks, CD, etc.

It should be noted that, although the present disclosure has been described with reference to the embodiments, it will be appreciated by those skilled in the art that the disclosure includes other examples that occur to those skilled in the art to execute the disclosure. Therefore, the present disclosure is not limited to the embodiments.

What is claimed is:

1. A fingerprint identification method, comprising:
   obtaining a to-be-identified fingerprint image and extracting first characteristic points of the to-be-identified fingerprint image;
   determining whether a number of the first characteristic points of the to-be-identified fingerprint image is less than a predetermined threshold;
   when the number of the first characteristic points of the to-be-identified fingerprint image is less than the predetermined threshold, selecting a fingerprint template image according to the number of the first characteristic points;
   extracting second characteristic points in the fingerprint template image matching with the first characteristic points of the to-be-identified fingerprint image;
   overlapping the fingerprint template image with the to-be-identified fingerprint image according to the first characteristic points of the to-be-identified fingerprint image and the second characteristic points of the fingerprint template image to form an overlapped image;
   determining a valid coincidence region between the to-be-identified fingerprint image and the fingerprint template image in the overlapped image; and
   determining whether the to-be-identified fingerprint image matches the fingerprint template image according to the valid coincidence region to generate a matching result and performing fingerprint identification based on the matching result.

2. The method according to claim 1, wherein determining whether the to-be-identified fingerprint image matches with the fingerprint template image according to the valid coincidence region to generate a matching result and performing fingerprint identification based on the matching result further comprises:
   calculating an area of the valid coincidence region;
   judging whether the area of the valid coincidence region is larger than or equal to a predetermined region threshold;
   when the area of the valid coincidence region is larger than or equal to the predetermined region threshold, determining that the to-be-identified fingerprint image matches the fingerprint template image and performing the fingerprint identification using the fingerprint template image; and
   when the area of the valid coincidence region is less than the predetermined region threshold, determining that the to-be-identified fingerprint image does not match the fingerprint template image and that the fingerprint identification fails.

3. The method according to claim 2, wherein performing the fingerprint identification using the fingerprint template image further comprises:
   calculating a fingerprint-line matching degree between the to-be-identified fingerprint image and the fingerprint template image in the valid coincidence region, wherein the fingerprint-line matching degree is a ratio of a fingerprint-line matching pixel number and a fingerprint-line non-matching pixel number between the to-be-identified fingerprint image and the fingerprint template image;
   determining whether the fingerprint-line matching degree is larger than a predetermined matching threshold; and
   when the fingerprint-line matching degree is larger than the predetermined matching threshold, determining that the to-be-identified fingerprint image and the fingerprint template image are from a same finger.

4. The method according to claim 1, wherein:
   the fingerprint template image is a tripleized image;
   a width of a ridge line and/or a valley line in the fingerprint template image is a first width value; and
   a pixel value of the ridge line of the fingerprint template image is a first pixel value, a pixel value of the valley line of the fingerprint template image is a second pixel value, and a pixel value of background of the fingerprint template image is a third pixel value.

5. The method according to claim 4, before overlapping the to-be-identified fingerprint image and the fingerprint template image, further comprising:
   performing a tripleization process on the to-be-identified fingerprint image to set a pixel value of a ridge line of the to-be-identified fingerprint image as the first pixel value, a pixel value of a valley line of the to-be-identified fingerprint image as the second pixel value, and a pixel value of background of the to-be-identified fingerprint image as the third pixel value; and
   setting a width of the ridge line and/or the valley line in the to-be-identified fingerprint image as the first width value.

6. The method according to claim 5, wherein obtaining the valid coincidence region between the to-be-identified fingerprint image and the fingerprint template image in the overlapped image comprises:
   setting a fourth pixel value, a fifth pixel value, and a sixth pixel value of pixels in the overlapped image as the pixels in the valid coincidence region, wherein the fourth pixel value is twice value of the first pixel value, the fifth pixel value is a sum of the first pixel value and the second pixel value, and the sixth pixel value is twice value of the second pixel value.

7. The method according to claim 1, wherein overlapping the fingerprint template image with the to-be-identified fingerprint image according to the first characteristic points of the to-be-identified fingerprint image and the second characteristic points of the fingerprint template image to form an overlapped image comprises:
calculating a rotation angle and a shift value between the fingerprint template image and the to-be-identified fingerprint image according to the first characteristic points of the to-be-identified fingerprint image and the second characteristic points of the fingerprint template image;
processing the to-be identified fingerprint image according to the rotation angle and the shift value to form a processed to-be-identified fingerprint image; and
overlapping the fingerprint template image and the processed to-be-identified fingerprint image to form the overlapped image.

8. A fingerprint identification apparatus, comprising:
an extracting module configured to obtain a to-be-identified fingerprint image and to extract first characteristic points of the to-be-identified fingerprint image;
a selecting module configured to, when a number of the first characteristic points of the to-be-identified fingerprint image is less than a predetermined threshold, select a fingerprint template image according to the number of the first characteristic points and to extract second characteristic points of the fingerprint template image matching with the first characteristic points of the to-be-identified fingerprint image;
a generating module configured to overlap the fingerprint template image with the to-be-identified fingerprint image according to the first characteristic points of the to-be-identified fingerprint image and the second characteristic points of the fingerprint template image to form an overlapped image;
a collecting module configured to determine a valid coincidence region between the to-be-identified fingerprint image and the fingerprint template image in the overlapped image; and
an identifying module configured to determine whether the to-be-identified fingerprint image matches the fingerprint template image according to the valid coincidence region to generate a matching result and to perform fingerprint identification based on the matching result.

9. The fingerprint identification apparatus according to claim 8, wherein the identify module is further configured to:
calculate an area of the valid coincidence region;
when the area of the valid coincidence region is larger than or equal to a predetermined region threshold, determine that the to-be-identified fingerprint image matches the fingerprint template image and to perform the fingerprint identification using the fingerprint template image; and
when the area of the valid coincidence region is less than the predetermined region threshold, determine that the to-be-identified fingerprint image does not match the fingerprint template image and that the fingerprint identification fails.

10. The fingerprint identification apparatus according to claim 9, wherein the identify module is further configured to:
calculate a fingerprint-line matching degree between the to-be-identified fingerprint image and the fingerprint template image in the valid coincidence region, wherein the fingerprint-line matching degree is a ratio of a fingerprint-line matching pixel number and a fingerprint-line non-matching pixel number between the to-be-identified fingerprint image and the fingerprint template image; and
when the fingerprint-line matching degree is larger than a predetermined matching threshold, determine that the to-be-identified fingerprint image and the fingerprint template image are from a same finger.

11. The fingerprint identification apparatus according to claim 8, wherein:
the fingerprint template image is a tripleized image;
a width of a ridge line and/or a valley line in the fingerprint template image is a first width value; and
a pixel value of the ridge line of the fingerprint template image is a first pixel value, a pixel value of the valley line of the fingerprint template image is a second pixel value, and a pixel value of background of the fingerprint template image is a third pixel value.

12. The fingerprint identification apparatus according to claim 11, further comprising:
a processing module configured to perform a tripleization process on the to-be-identified fingerprint image to set a pixel value of a ridge line of the to-be-identified fingerprint image as the first pixel value, a pixel value of a valley line of the to-be-identified fingerprint image as the second pixel value, and a pixel value of background of the to-be-identified fingerprint image as the third pixel value; and
a setting module configured to set a width of the ridge line and/or the valley line in the to-be-identified fingerprint image as the first width value.

13. The fingerprint identification apparatus according to claim 12, wherein the collecting module is configured to set a fourth pixel value, a fifth pixel value, and a sixth pixel value of pixels in the overlapped image as the pixels in the valid coincidence region, wherein the fourth pixel value is twice value of the first pixel value, the fifth pixel value is a sum of the first pixel value and the second pixel value, and the sixth pixel value is twice value of the second pixel value.

14. The fingerprint identification apparatus according to claim 12, wherein the generating module is further configured to:
calculate a rotation angle and a shift value between the fingerprint template image and the to-be-identified fingerprint image according to the first characteristic points of the to-be-identified fingerprint image and the second characteristic points of the fingerprint template image;
process the to-be identified image according to the rotation angle and the shift value to form a processed to-be-identified fingerprint image; and
overlap the fingerprint template image and the processed to-be-identified fingerprint image with a coincident portion to form the overlapped image.

15. A non-transitory computer-readable storage medium having stored therein instructions that, when executed by a processor of a device, causes the device to perform a method of fingerprint identification, the method comprising:
obtaining a to-be-identified fingerprint image and extracting first characteristic points of the to-be-identified fingerprint image;

determining whether a number of the first characteristic points of the to-be-identified fingerprint image is less than a predetermined threshold;

when the number of the first characteristic points of the to-be-identified fingerprint image is less than the predetermined threshold, selecting a fingerprint template image according to the number of the first characteristic points;

extracting second characteristic points in the fingerprint template image matching with the first characteristic points of the to-be-identified fingerprint image;

overlapping the fingerprint template image with the to-be-identified fingerprint image according to the first characteristic points of the to-be-identified fingerprint image and the second characteristic points of the fingerprint template image to form an overlapped image;

determining a valid coincidence region between the to-be-identified fingerprint image and the fingerprint template image in the overlapped image; and determining whether the to-be-identified fingerprint image matches the fingerprint template image according to the valid coincidence region to generate a matching result and performing fingerprint identification based on the matching result.

16. The non-transitory computer-readable storage medium according to claim 15, wherein determining whether the to-be-identified fingerprint image matches with the fingerprint template image according to the valid coincidence region to generate a matching result and performing fingerprint identification based on the matching result further comprises:

calculating an area of the valid coincidence region;

judging whether the area of the coincidence region is larger than or equal to a predetermined region threshold;

when the area of the valid coincidence region is larger than or equal to the predetermined region threshold, determining that the to-be-identified fingerprint image matches the fingerprint template image and performing the fingerprint identification using the fingerprint template image; and when the area of the coincidence region is less than the predetermined region threshold, determining that the to-be-identified fingerprint image does not match the fingerprint template image and that the fingerprint identification fails.

17. The non-transitory computer-readable storage medium according to claim 16, performing the fingerprint identification using the fingerprint template image further comprises:

calculating a fingerprint-line matching degree between the to-be-identified fingerprint image and the fingerprint template image in the valid coincidence region, wherein the fingerprint-line matching degree is a ratio of a fingerprint-line matching pixel number and a fingerprint-line non-matching pixel number between the to-be-identified image and the fingerprint template image;

determining whether the fingerprint-line matching degree is larger than a predetermined matching threshold; and when the fingerprint-line matching degree is larger than the predetermined matching threshold, determining that the to-be-identified fingerprint image and the fingerprint template image are from a same finger.

18. The non-transitory computer-readable storage medium according to claim 15, wherein:

the fingerprint template image is a tripleized image;

a width of a ridge line and/or a valley line in the fingerprint template image is a first width value; and a pixel value of the ridge line of the fingerprint template image is a first pixel value, a pixel value of the valley line of the fingerprint template image is a second pixel value, and a pixel value of background of the fingerprint template image is a third pixel value.

* * * * *